US005616861A

United States Patent [19]

Hagen

[11] Patent Number: 5,616,861
[45] Date of Patent: Apr. 1, 1997

[54] THREE PRESSURE PSEUDO -Δ-P SENSOR FOR USE WITH THREE PRESSURE AIR DATA PROBE

[75] Inventor: Floyd W. Hagen, Eden Prairie, Minn.

[73] Assignee: Rosemount Aerospace Inc., Burnsville, Minn.

[21] Appl. No.: 475,350

[22] Filed: Jun. 7, 1995

[51] Int. Cl.$^6$ ..................................................... G01C 21/20
[52] U.S. Cl. ........................... 73/180; 73/182; 73/170.02; 73/861.66
[58] Field of Search ......................... 73/180, 182, 170.02, 73/861.65, 861.66, 861.67, 861.68

[56]  References Cited

U.S. PATENT DOCUMENTS

| | | | |
|---|---|---|---|
| 3,094,868 | 6/1963 | Andersen et al. | 73/180 X |
| 3,149,491 | 7/1964 | Sissenwine et al. | 73/180 X |
| 3,318,146 | 5/1967 | DeLeo et al. | 73/180 |
| 3,930,412 | 1/1976 | Mallon et al. | 73/721 |
| 4,096,744 | 6/1978 | DeLeo et al. | 73/180 |
| 4,222,277 | 9/1980 | Kurtz et al. | 73/721 |
| 4,322,980 | 4/1982 | Suzuki et al. | 73/727 |
| 4,378,696 | 4/1983 | DeLeo et al. | 73/180 |
| 4,378,697 | 4/1983 | DeLeo et al. | 73/182 |
| 4,428,549 | 1/1984 | Halliday et al. | 73/182 X |
| 4,565,096 | 1/1986 | Knecht | 73/718 |
| 4,790,192 | 12/1988 | Knecht et al. | 73/721 |
| 4,836,019 | 6/1989 | Hagen et al. | 73/180 |
| 5,116,331 | 5/1992 | Chapman | 73/721 |
| 5,319,970 | 6/1994 | Peterson | 73/182 |
| 5,331,849 | 7/1994 | Hedberg et al. | 73/182 |
| 5,369,993 | 12/1994 | Hagen et al. | 73/178 |

*Primary Examiner*—Richard Chilcot
*Assistant Examiner*—Joseph L. Felber
*Attorney, Agent, or Firm*—Westman, Champlin & Kelly, P.A.

[57]  ABSTRACT

An air data sensing system utilizes a plurality of probes, each probe having three pressure sensing ports, and each assembled with a sensor package that minimizes the need for corrections due to temperature or other variations in ambient conditions. The system is mounted on an air vehicle using two or three sets of right and left pairs of probes. The probes of each set are vertically spaced from the probes of the other sets. The probes are made light weight and small. In the arrangement shown the probes provide triple redundancy and because of the orientation on the air vehicle provide all needed pressure and angle information, including the angle of sideslip.

12 Claims, 5 Drawing Sheets

THREE PRESSURE PSEUDO -Δ-P SENSOR FOR USE WITH THREE PRESSURE AIR DATA PROBE

BACKGROUND OF THE INVENTION

The present invention relates to an air data sensing system that utilizes one or more probes, each having at least three ports for providing the necessary input pressures for determining angle of attack, pitot pressure, static pressure, and angle of sideslip of an air vehicle. A unique pressure sensor used with the three port probe comprises a unitary diaphragm type pressure sensor that is formed on a single chip and mounted on a homogeneous single base plate to minimize extraneous effects of temperature on the sensors.

Sensing air data information utilizing external pressure sensing tubes or probes on vehicles has been known. Dual static tubes and connected pressure sensors for determining the speed, altitude and angle of attack are shown in U.S. Pat. Nos. 4,378,696 and 4,378,697.

Additionally, in recent years the emphasis on making pressure sensing probes compact and low drag has been illustrated by the devices shown in U.S. Pat. Nos. 4,836,019 and 5,331,849. Aerodynamic shaping of compact or small pressure sensing probes is shown in U.S. Pat. No. 5,319,970. Another important requirement for air vehicle sensing systems is to have redundancy so that in case one system fails, the needed air data information will be provided by the redundant system.

SUMMARY OF THE INVENTION

The present invention discloses an air data sensing system that preferably utilizes one or more probes, each having plurality of pressure sensing ports, assembled with pressure sensors that minimize the need for correction dye to temperature variations or the like. Each probe preferably has three pressure sensing ports. The probe pressure measurements may be used alone or with separate sensed static pressure.

Further, the individual probes are mounted in a configuration on an air vehicle that provides redundancy with a minimum of weight and a minimum of installation location.

The probe arrangement permits angle of attack, pitot pressure, as well as the static pressure to be obtained from the readings of each of the probes. By installing pairs of probes as symmetrical sets with one probe from each set on each side of the air vehicle, (right and left), variations in the readings between sensed pressures of selected probes, and/or static pressure measured at one or more static pressure ports, on opposite sides of the air vehicle for example, the right and left probe of each set will give an indication of angle of sideslip (β). Also probes on the same side of the air vehicle can be used for determining β. Sideslip is defined at occurring when the direction of relative airflow past the air vehicle is at an angle relative to the longitudinally central plane or flight reference line (FRL) of the air vehicle.

The needed pressure signals are easily obtained by simple pressure sensor arrangements, using known circuitry, and by utilizing a flight data computer that has suitable look-up tables for providing outputs that are functions of pressure sensor signals. The outputs are determined empirically or experimentally from wind tunnel tests to provide the actual angle of attack, angle of sideslip or other parameter of each of the probes, based on the pressure measurements at its own three ports.

The preferred embodiment of pressure sensor utilized with the probe is a single module that has a unitary semiconductor chip from a single crystal having pressure sensing diaphragms, and a unitary support base for the diaphragm carrying chip. Each of the diaphragms is coupled to sense the pressure from a respective port on the associated probe. Further, in the preferred form, the opposite sides of the diaphragms from the sides open to the pressures provided from the probe are connected to a common reference pressure, such as a hard vacuum source. Each of the diaphragms will thus be provided with precisely the same reference pressure.

The arrangement disclosed simplifies compensation of pressure signals received, and with less complex circuitry needed.

The pressure sensor module is useful for sensing pressures where individual pressure signals indicating the pressure at each port are desired, and also when differentials between the pressure signals are desired. The needed information is calculated with external circuitry.

DETAILED DESCRIPTION OF THE PREFERRED EMBODIMENTS

Referring to the drawings, an air vehicle of conventional design, such as an air vehicle shown only schematically at 10 is provided with a plurality of individual air data sensing probes that can be identical, and they are in sets of two, symmetrically mounted on opposite sides of a vertical center plane 12 of the air vehicle 10 which includes the longitudinal axis of the air vehicle.

In conventional designs, pitot tubes and pitot-static tubes that are used are relatively large and have significant weight. In general, four such tubes are used on conventional aircraft, for redundancy, but in the present invention, compact air data probes are utilized. Such compact probes are shown in U.S. Pat. Nos. 4,836,019 and 5,331,849. A continuously curved strut mounted sensor that also can be made very compact is shown in U.S. Pat. No. 5,319,970. When only three ports are used, the internal connections are more simple and lighter.

Figure 1:
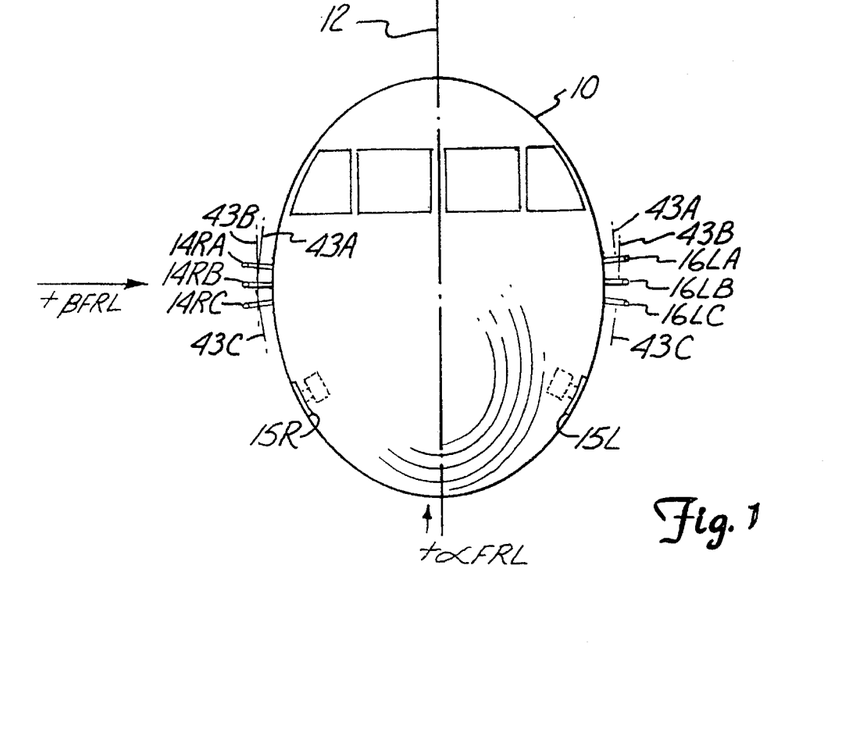
FIG. 1 is a schematic front elevational view of a typical air vehicle having probes and an air data system made according to the present invention installed on the air vehicle.
Figure 2:
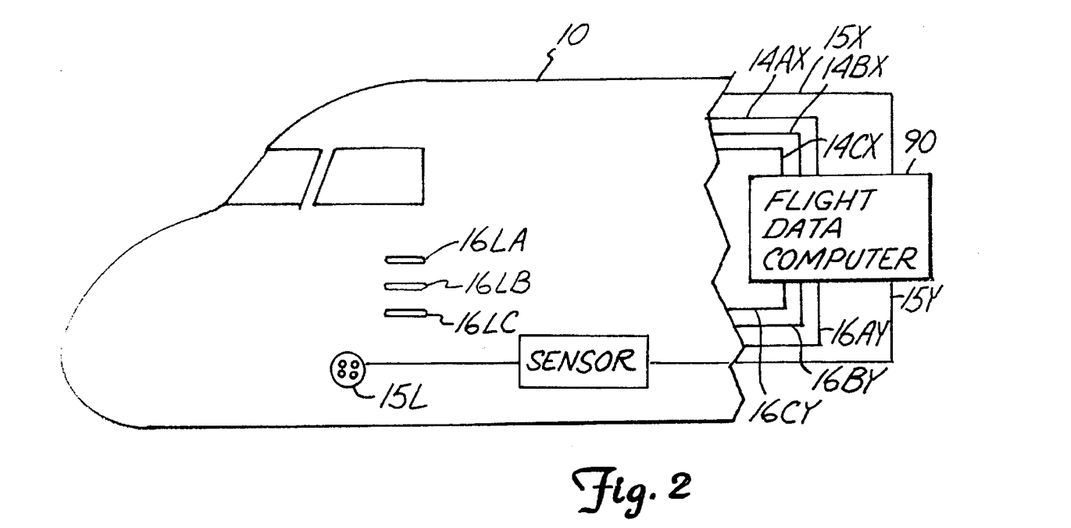
FIG. 2 is a fragmentary schematic side elevational view of the air vehicle shown in FIG. 1.

As shown in FIGS. 1 and 2, the air vehicle 10 is provided with a first (and upper) right-hand air data probe 14RA, a second (center) right-hand air data sensing probe 14RB, and an optional third (and lower) right-hand air data sensing probe 14RC. In addition, symmetrically located relative to the central plane shown at 12, and at the same plane perpendicular to the longitudinal axis of the air vehicle, is a first (upper) left-hand air data probe 16LA, a second (center) left-hand air data probe 16LB, and an optional third (lower) left-hand air data probe 16LC. The probes 14RA-14RC and 16LA-16LC can be all identically constructed, so only a single probe will be described in detail.

As shown in FIG. 1, the probes 14RA-RC and 16LA-LC are mounted along the side of the air vehicle 10, and are forwardly facing, and also they are mounted vertically spaced from each other. Because the air vehicle skin is curved in cross section, the central planes of the probes are inclined at different angles relative to the air vehicle central vertical plane 12 and relative to a horizontal reference plane.

Figures 3, 4:
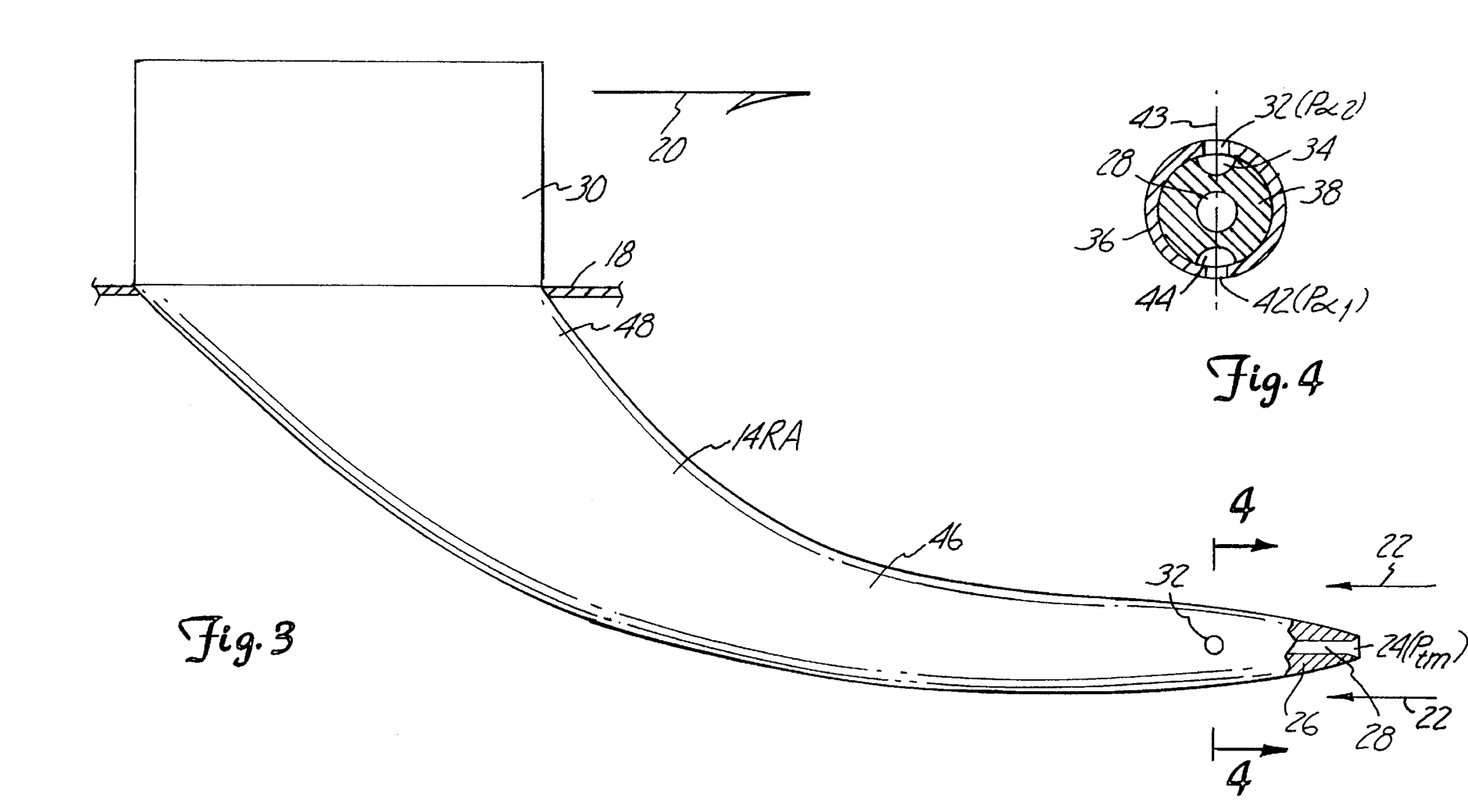
FIG. 3 is a top plan view of one of the right-hand side air data sensing probes installed on the air vehicle of FIG. 1.
FIG. 4 is a sectional view taken on line 4—4 in FIG. 3 oriented to put a top port at the top of the figure.

Flush static port modules 15R and 15L that are located on the sides of the air vehicle also can provide measured static pressures that can be used in the system for computing sideslip angles.

specifically, in FIGS. 3 and 4, a typical air data probe 14RA is illustrated. FIG. 3 is a top plan view. The probe is suitably mounted on the wall 18 of the air vehicle 10. The normal direction of movement of the air vehicle is illustrated by the arrow 20, and thus flow past the air vehicle and the probe 14RA is illustrated by the arrows 22.

The air data probe 14RA has ports to sense three individual pressures comprising a pitot or total pressure that is designated $P_{tm}$, and which is measured at a sharp edge pitot port 24 on the leading end of the probe. The leading end of the probe 14RA is illustrated at 26. The exterior surface of the probe 14RA tapers toward the sharp edge of the port 24. The port 24 has a provided conduit or passage 28 connected to it, which carries the pressure signal to suitable instrumentation contained in a light weight, two pressure sensor package illustrated at 30. In addition, the probe 14RA, and 11 of the air data probes used in the present invention, has a pair of angle of attack sensing ports. Again, FIG. 3 is a top plan view of the unit, and an upper side or top angle of attack sensing port 32, which senses $P\alpha_2$, and, as shown in FIG. 4, opens to a passageway or conduit 34 on the interior of a probe barrel 36. The conduit 34 is formed in an insert block 38 as disclosed in the previously mentioned prior art compact air data sensors. The probe can be cast as a unit. The conduit 34 leads to sensor package 30.

The pressure sensed at top port 32 is designated $P\alpha_2$. A bottom angle of attack sensing port 42, $P\alpha_1$, has an axis that is on a plane 43 that includes the axis of port 32 and the longitudinal axis of the probe barrel. This is the angle of attack sensing plane and is parallel to the fuselage surface at the mounting of the "A" probes as shown at 43A in FIG. 1. The measuring plane for angle of attack is angled at the "B" and "C" probes as shown exaggerated at 43B and 43C in FIG. 1. The planes 43B and 43C are rotated about an axis parallel to the longitudinal axis of the air vehicle. Bottom sensing port 42 opens to a passageway 44 also defined in the block 38. The bottom port 42 senses a pressure designated $P\alpha_1$, and that pressure is also carried back to the pressure sensors mounted in a closely coupled, light weight sensor package 30.

The probe 14RA, as shown, also includes a continuously curved strut 46 that attaches to a base section 48 that mounts onto the air vehicle wall 18. The general cross section of the air data probe 14RA, as well as the rest of the air data probes that are shown can be selected to suit existing circumstances as shown in the prior art patents mentioned above.

The probes, such as shown at 14RA in FIG. 3 and 4 thus are three-pressure sensing probes, sensing $P_{tm}$, $P\alpha_1$ and $P\alpha_2$. As is well known, the differentials in pressure between ports 32 and 42 will indicate angle of attack. As shown, the central planes of the probes 14 and 16, when arranged in a vertically stacked configuration will have slightly different angles 43 relative to the central plane 12. Stated another way, the plane defined by the axes of the angle of attack sensing ports 32 and 42 of each probe inclines differently at the "B" and "C" probes than at the "A" probes. The difference in inclination of the probes is such that the ports 32 and 42 of each of the air data sensing probes on the same side of the air vehicle will indicate the angle of the sideslip, or in other words, angle β. Sideslip angle is the angle of plane 12 relative to the direction of forward air flow movement impinging the air vehicle.

Figure 5:
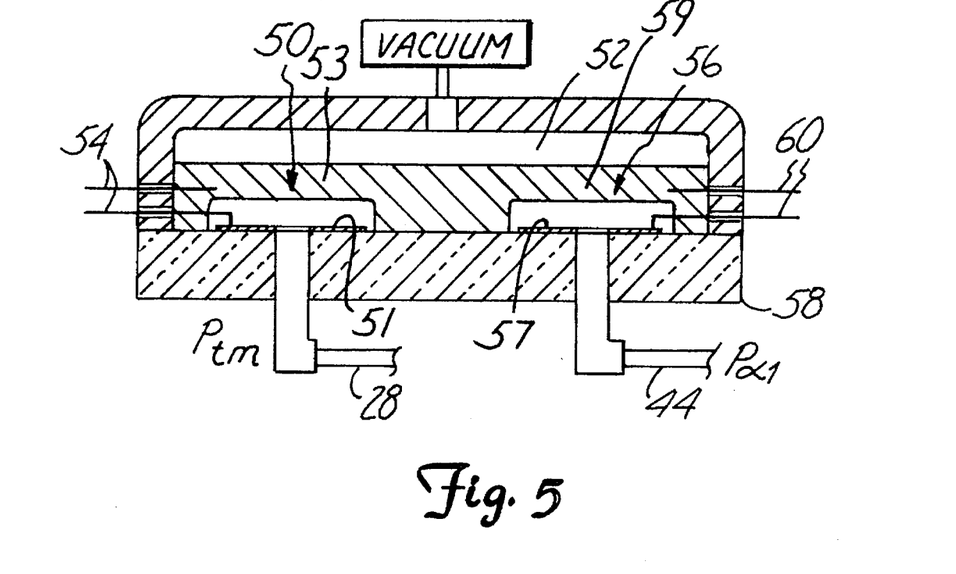
FIG. 5 is a schematic representation of a typical differential pressure sensor using the pressure signals from an air data probe of the present invention to obtain the desired electrical signals.

The pressure sensing package 30 contains at least two differential pressure sensors in the normal situation. As shown at FIG. 5, the pressure applied to a first differential pressure sensor 50 from the passageway 28 carries the pressure $P_{tm}$. In the form shown the pressure sensor 50 is a diaphragm type pressure sensor having a reference pressure chamber 52 that is connected to a vacuum or some other suitable reference pressure. The differential between the pressure in the chamber 52, and the pressure in the passageway 28, which is open to the opposite side of the diaphragm of sensor 50, will provide an electric output signal along leads 54 from a capacitive sensor having a deposited capacitive plate 51 and a doped on plate on the diaphragm 53 connected in a circuit in a conventional manner. The signal on leads 54 is a measure of pressure differential between the reference pressure and the pressure in passageway 28.

A pressure applied to a second differential pressure sensor 56 from the passageway or line 44, carries the pressure $P\alpha_1$. In the form shown the pressure sensor 56 is on the same assembly as sensor 50 and is a diaphragm type pressure sensor also having reference pressure chamber 52 that is connected to a vacuum or some other suitable reference pressure. The differential between the pressure in the chamber 52, and the pressure in the passageway or line 44, which is open to the opposite side of the diaphragm of sensor 56, will provide an electric output signal along leads 60 from a capacitive sensor having a deposited plate 57 and a doped on plate on diaphragm 59, connected in a circuit in a conventional manner. The signal along leads 60 is a measure of pressure differential between the reference pressure and the pressure in passageway or line 44.

The sensor 50 and second sensor 56 are formed from a single silicon chip or wafer mounted on a unitary block 58 so that the sensors are affected the same by temperature and other external conditions to avoid the effect of undue variations in the environment that can affect pressure readings.

Suitable excitation and electrical connections are provided to provide outputs along lines 54 for the pressure sensor 50, and line 60 for the pressure sensor 56. The sensors may be capacitive sensors sensing signals between capacitive plates 53 and 59 deposited on the base and the semiconductor diaphragms, or the sensing may use strain gages doped on the diaphragms. These lines 54 and 60 carry signals that can be combined or individually sensed. Thus, line 54 carries a signal indicating $P_{tm}$ and line 60 carries a signal indicating $P\alpha_1$. The outputs from this sensor also can be combined to provide ($P_{tm}$–$P_1$), a quantity that is used in calculating various necessary pressure quantities for satisfactory air vehicle operation.

Figure 6:
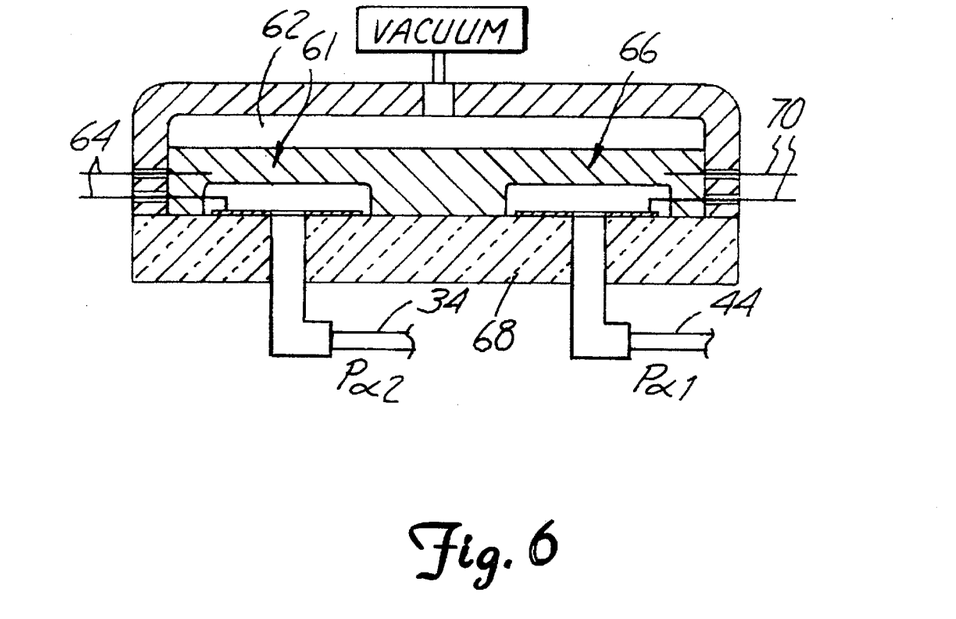
FIG. 6 is a schematic view of a pressure sensor similar to that shown in FIG. 5 connected to receive separate pressure signals utilized for obtaining data in the present invention.

FIG. 6 illustrates a second sensor carried in the sensor package 30, which includes a pressure sensor 61 that is connected to the passageway 34. The pressure sensor 61 has a reference vacuum pressure present in a reference pressure chamber 62. The pressure sensor 61 is thus capable of providing an output along a line 64 indicating $P\alpha_2$. The sensor 61 a second sensor 66 are formed from a single silicon chip or wafer mounted on a unitary block 68 so that the sensor is affected the same by temperature and other external conditions to avoid the effect of undue variations in the environment that can affect pressure readings.

One side of the diaphragm of sensor 66 is connected to the passageway 44 and thus the input to sensor 66 is $P\alpha_1$. The sensor 66 output along a line 70 indicates $P_1$.

The sensors 61 and 66 can be capacitive sensors of conventional design, or can be strain gages doped on the diaphragms, as is also conventional.

The output from the sensor block 68 and the sensors 66 and 61 thus are $P\alpha_1$, $P\alpha_2$, and the outputs can be connected to provide an output ($P\alpha_1$–$P\alpha_2$).

Basic equations for providing the necessary parameters include the following:

$$P_{sm} = \frac{P\alpha_1 + P\alpha_2}{2} \quad (1)$$

$$q_{cm} = (P_{tm} - P\alpha_1) + \frac{(P\alpha_1 - P\alpha_2)}{2} \quad (2)$$

$$\alpha_{tube} = f\left[\left[\frac{P\alpha_1 - P\alpha_2}{q_{cm}}\right], \frac{q_{cm}}{P_{sm}}\right] \quad (3)$$

$P_{sm}$ is measured static pressure at each probe $\alpha_{tube}$ is the measured angle of attack of the probe $q_{cm}$ is a normalized impact pressure function as defined by equation (2)

$P\alpha_1$ and $P\alpha_2$ are the pressures sensed at the angle of attack sensing ports $P_{tm}$ is the measured pitot pressure From these equations, it can be seen that the static pressure measured can be obtained by averaging the pressures at the ports 32 and 42 on each of the probes, and an average of those pressures can be taken if desired. A normalized impact pressure function, qcm is obtained by the outputs from the differential pressure sensors. The angle of attack of each of the probes is a function of the pressures measured at the ports 42 and 32, normalized by dividing the difference in these pressures by qcm, and the result combined with $q_{cm}$ divided by the static pressure, $P_{sm}$ (equation 3).

Figure 7:
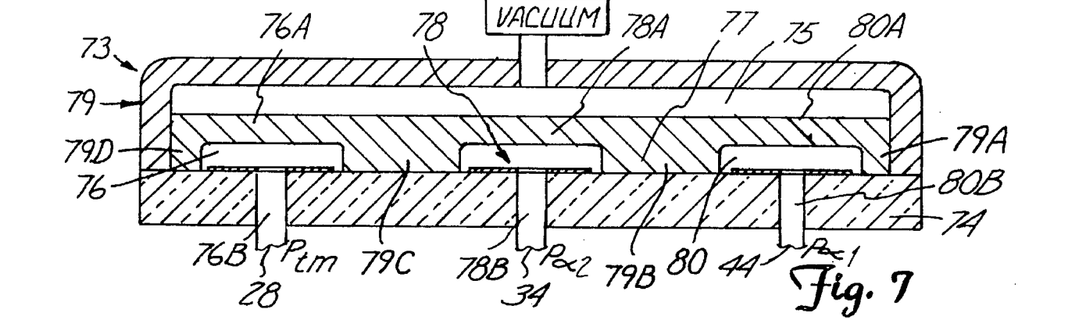
FIG. 7 is a preferred embodiment of a pressure sensor utilizing a unitary sensor module with a single chip sensing diaphragm layer for receiving the three pressure signals from one of the air data sensing probes used with the present invention.
Figure 8:
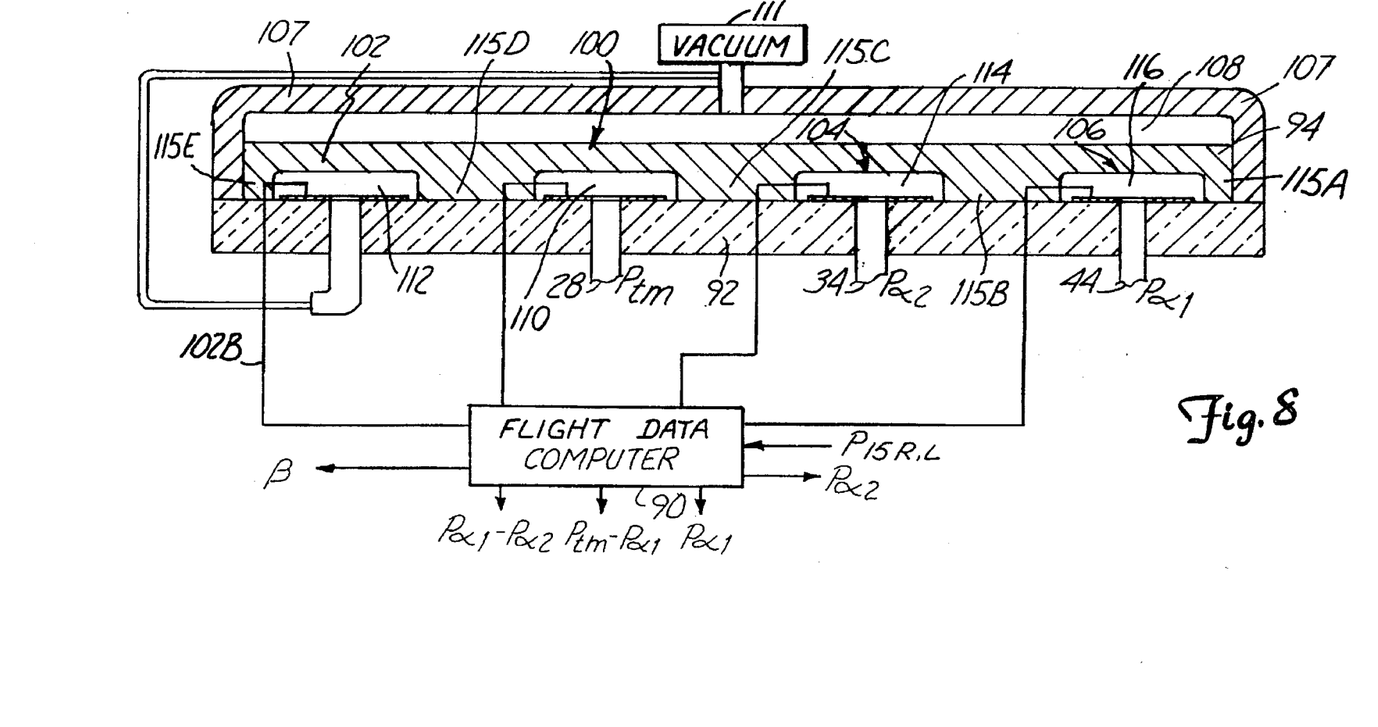
FIG. 8 is a modified form of a unitary pressure sensor used with the present invention and providing a reference pressure sensor as part of the module.

The preferred forms of pressure sensors utilized in place of the two individual sensors shown in FIGS. 5 and 6 are illustrated in FIGS. 7 and 8. First, referring to FIG. 7, a single solid state module pressure sensor shown at 73 comprises a unitary, homogeneous base 74 of a suitable table support material such as glass, sapphire or silicon. A diaphragm forming layer 77 generally of a semi-conductor material from a single wafer is provided with separated recesses forming three diaphragms. These recesses are shown at 76, 78 and 80 in FIG. 7 and are bounded by thicker rims to form chambers. The wafer thus is formed to have three thin diaphragms 76A, 78A and 80A. The diaphragm layer 77 is bonded to the base layer 74 to isolate the chambers 76, 78 and 80 from each other to form three individual pressure sensors. The rims around the recesses are sealed to the base to form the individual chambers. A suitable pressure tight cover 79 can be placed over the diaphragms in a known manner to form a reference pressure chamber 75. The base 74 has suitable passageways 76B, 78B and 80B formed therethrough for receiving pressures from the ports of a single probe. The sensor assembly 3 thus has three live, active sensor diaphragms formed on a unitary block or layer and mounted on a unitary single block base layer. Three pressures are sensed by the sensor with three active diaphragms formed on a unitary layer.

The passageway 76B is connected to receive the pitot pressure $P_{tm}$, that is, it is connected to passageway, 28. Passageway 78B is connected to receive the pressure $P\alpha_2$, and thus is connected to passageway 34. Passageway 80B is connected to sense pressure $P\alpha_1$ and thus is coupled to passageway 44 of the respective probe.

The reference pressure chamber 75 that opens to the opposite sides of the diaphragm from the base 74, is connected to vacuum.

The output signals obtained from the sensors on suitable output signal lines from flight data computer 90 (shown in FIG. 8) include ($P_{tm}$–$P\alpha_1$); ($P\alpha_1$–$P_2$) and individual sensing for $P\alpha_1$ and $P\alpha_2$. The individual sensor outputs may not be needed for some functions, if other pressure conditions are met. The calculated functions again are as shown in the basic equations (1); (2);(3) above. The deflection of the diaphragms can be sensed by capacitive sensing, by strain gages on the diaphragms, by optical sensing, or by other known devices.

In FIG. 8, a further modified type of a three pressure input unitary pressure sensor useful with the air data probes of the present invention is illustrated. In this form of the invention, a unitary, single block base 92 is used for mounting a diaphragm forming wafer or layer 94 that has four diaphragms 100, 102, 104, and 106 formed therein. The diaphragms 100, 102, 104, and 106 are formed on single wafer 94 by recesses 110, 112, 114 and 116 in the wafer. The recesses are bounded by rims 115A, 115B, 115C, 115D and 115E that support the diaphragms for deflection. A pressure cover 107 is sealingly mounted on the base 92 and encloses all of the diaphragms. Pressure cover 107 forms a reference pressure chamber 108. The diaphragm layer or wafer is bonded to the base 92 and the rims around the recesses seal to separate the chambers from each other. A source of reference pressure (vacuum) indicated at 111 is omen to the chamber 108 so one side of each sensing diaphragm is under the same reference pressure as the other diaphragms on the wafer.

In this form of the invention, the sensor recesses 110,114 and 116 are connected to the ports 28, 34 and 44, respectively, to sense $P_{tm}$, $P\alpha_2$ and $P\alpha_1$. However, in order to provide an additional reference output, recess 112 is connected to a passageway that is schematically shown as being connected to reference pressure on both sides of the diaphragm 102. The reference sensor provides an output signal along a line represented schematically at 102B to correct most systematic errors of the other three sensors. All of these sensors are mounted onto the common or unitary mounting base 92 as previously explained. The sensor signal outputs are carried to flight data computer 90 and through suitable subtraction circuits, the signals shown in FIG. 8 for each of the probes can be obtained.

In the form of the sensor shown in FIG. 7, the common vacuum source or chamber eliminates absolute pressure drift errors for $(P_{tm}-P\alpha_1)$ and for $(P\alpha_1-P\alpha_2)$. The three diaphragms are oriented the same way on the diaphragm wafer, and thus pressure errors due to vibration, temperature, temperature drift, acceleration and other external factors will be greatly reduced.

The deflection of the diaphragms under pressure is sensed using conventional arrangements, such as capacitive plates or sensing resistors on the diaphragm, strain gages, optical sensors or the like. Thus, the diaphragms are close to the same environment and subject to the same conditions. It should be noted that three capacitor plates are shown on the base of each sensor and the plates have pressure openings aligning with the inlet passageways so pressure can act on the diaphragms.

In the present invention, the individual tubes or air data probes 14RA-14RC and 16LA-16LC can be identical, and provided with two pitot drain holes (not shown) on the top and bottom of each probe so that the probes are interchangeable for the right and left-hand applications. In other words, these air data probes will have drain holes, and the drain hole has to be on the bottom to drain, so by having drain holes on both sides, the probes can be inverted so interchangeability is made possible.

Each probe is small, light weight and of low drag design, as previously described. The compact design probes which as shown have insert blocks in the tube for forming passageways, do not require individual tubes or conduits to each of the ports, so they have much less weight than conventional probes and have less drag. Space for adequate probe deicing heaters is available, and the total weight for the six smaller probes used is about the same as for four conventional construction probes.

The present invention eliminates the need or flush static ports, or plates, and eliminate the need for separate angle of attack sensing vanes. Only one probe design is needed for all four to six installations, so there is a reduction in the number of parts that have to be inventoried.

Only four to six installations are needed on each air vehicle, and with three completely separate inputs to three separate flight data computers, there can be triple redundancy. Right and left symmetrical pressures, such as the pitot pressures or the normalized $q_{cm}$ pressures, can be averaged for supersonic applications, in order to permit operation at supersonic speeds. The corrections from local measured pressure values to true values can be made in each transducer 30, except for angle of sideslip corrections. If desired, all corrections can be made in each flight data computer. The only inputs needed are $(P_{tm}-P\alpha_1)$; $(P\alpha_1-P\alpha_2)$; and $P\alpha_1$, $P\alpha_2$ independently, although the $P\alpha_2$ separate pressure signal may not be needed, when the following relationship is used:

$$(P\alpha_1+P\alpha_2)/2=P\alpha_1-[P\alpha_1-P\alpha_2]/2$$

The angle of sideslip can be obtained because of the differences in pressure at ports on probes at different locations on the air vehicle. For example, measured static pressure differences between probes on the opposite sides of the aircraft will be a function of the angle of sideslip ($\beta$). This can be stated as:

$$P_{SRA} - P_{SLA} = f_1\left(\beta, \alpha_{tube}, \frac{q_{cm}}{P_{sm}}\right) \quad (4)$$

$P_{SRA}$ is the static pressure at the top right-hand probe
$P_{SLA}$ is the static pressure at the top left-hand probe
$q_{cm}$ is a normalized impact pressure function
$P_{sm}$ is the measured static pressure
$\alpha_{tube}$ is the measured angle of attack of the probe which is the average signal from the right and left probes when under sideslip conditions.
$\beta$ is the angle of sideslip If desired, measured static pressure can be provided from the static pressures measured at static ports 15R and 15L

The angle of attack function for other sets of air data probes also is affected by angle of sideslip.

Thus:

$$(\alpha_{tube_{RC}} - \alpha_{tube_{LC}}) = f_1\left(\beta, \alpha_{tube}, \frac{q_{cm}}{P_{sm}}\right) \quad (5)$$

where $$\alpha_{tube} = \frac{(\alpha_{tube_{RC}} + \alpha_{tube_{LC}})}{2}$$

Additional redundancies are available because the data sensitivity of the static pressure and the measured angle of attack of the tubes or probes are different at each of the three vertically different locations on each side of the air vehicle, because the planes of the probes are at different angles relative to the air vehicle reference plane. The needed redundancies may be obtained with only two sets of probes, for example, the top and bottom sets. Also, the static pressure measured at ports 15R ($P_{15R}$) and 15L ($P_{15L}$) can be combined with measurements at one set of probes to provide $\beta$ indicators.

The angle of sideslip can also be obtained by determining the differences in the sensed pressures at probes on the same side of the air vehicle.

For the right side probes, static pressures $P_{RA}-P_{RB}$; $P_{RA}-P_{RC}$ and $P_{RB}-P_{RC}$ are all functions of ($\beta$, $\alpha_{tube}$, $q_{cm}/P_{sm}$). Angle of attack at the respective probes, namely, $\alpha_{tubeRA}-\alpha_{tubeRB}$; $\alpha_{tubeRA}-\alpha_{tubeRC}$ and $\alpha_{tubeRB}-\alpha_{tubeRC}$ are also functions of ($\beta$, $\alpha_{tube}$, $q_{cm}/P_{sm}$). The left side probes have the same relationships.

Basically, $+\alpha_{FRL}$ is upwardly air vehicle angle of attack, with flow up from the bottom of the air vehicle, and $+\alpha_{FRL}$ is air vehicle angle of sideslip, with relative flow from the ride side of the vehicle, as shown in FIG. 1.

Using the sensed or measured static pressures at ports 15R and 15L ($P_{15R}$, $P_{15L}$) and the measured static pressures P at one set of probes, for example at probes $14_{RA}$ and $16_{LA}$, the following relationships can be developed for functions of sideslip:

$$\beta = f(P_{14RA}-P_{16LA})$$

$$\beta = f(P_{15R}-P_{15L})$$

$$\beta = f[(P_{16LA}-P_{15R}), \alpha_{16LA}]$$

$$\beta = f[(P_{14RA}-P_{15L}), \alpha_{14RA}]$$

$$\beta = f[(P_{16LA}-P_{15L}), \alpha_{16LA}]$$

$$\beta = f[(P_{14RA}-P_{15R}), \alpha_{14RA}]$$

where
P=measured static pressure at the designated probe or port

α=measured angle of attack at the designated probe

The static pressures from ports 15 can be measured and provided to flight computer 90 directly along lines 15X and 15Y as shown in FIG. 2. The static ports $15_R$ and $15_L$ are located at a position spaced from the set of probes used. The probes and ports are shown at about the same longitudinal location or position but they can be at different longitudinal positions from each other.

The function for β defined above can be solved by the flight computer 90 using look up tables developed from computational methods or experimental methods, such as wind tunnel tests.

Figure 9:
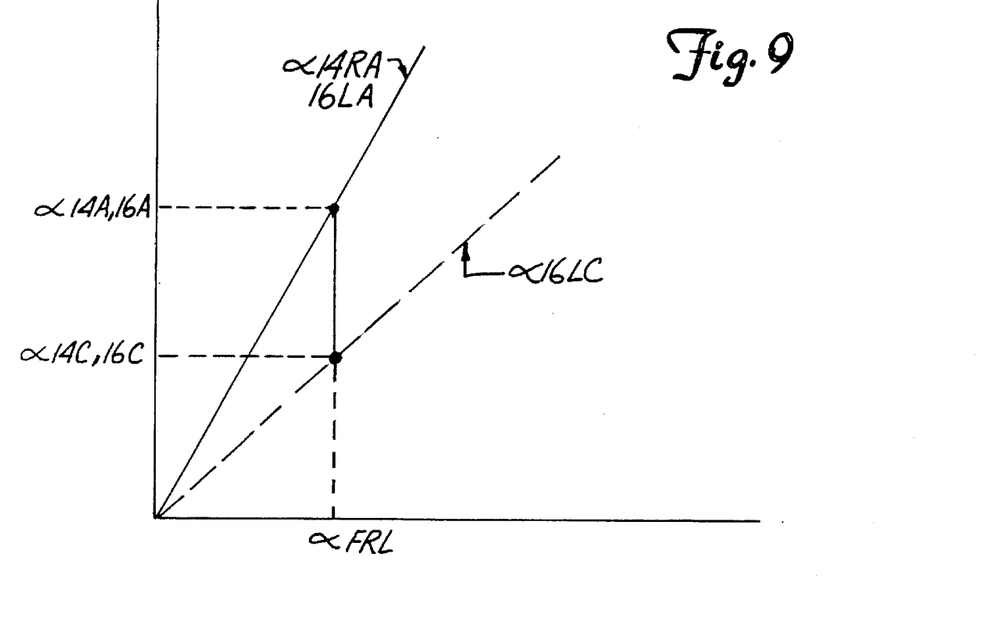
FIG. 9 is a graphical representation of local angle of attack sensed at the upper and lower probes on one side of the air vehicle at zero angle of sideslip.

FIG. 9 illustrates the relationship of measured angle of attack (α) at probes 14RA and 16LA and at probe 16LC as a function of air vehicle angle of attack $\alpha_{FRL}$ for zero air vehicle angle of sideslip ($\beta_{FRL}$=0 ). At any given angle of sideslip ($\beta_{FRL}$) the measured angle of attack value at the "C" probes responds as shown in FIG. 10.

It has also been found that combining the signals from the air data probes at different vertical positions on opposite sides of the air vehicle will provide increased sensitivity to angle of sideslip. For example, using the top set of probes 14RA and 16LA, as well as the bottom left probe, 16LC, it has been found that the relationship shown in FIGS. 9 and 10 will arise.

Figure 10:
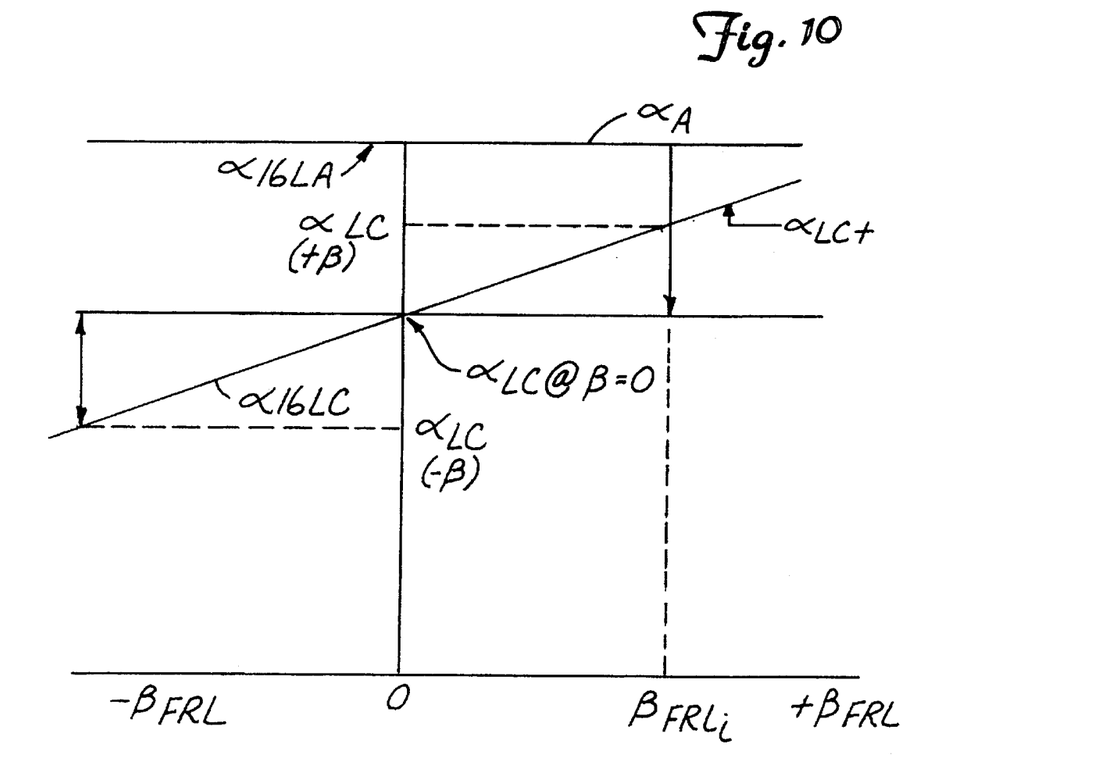
FIG. 10 is a graphical representation of measured local angle of attack at upper and lower probes plotted to show the effect of changing angle of sideslip.

FIG. 10 shows the sensitivity at a constant air vehicle angle of attack of the probe 16LC (lower left) to angle of sideslip relative to probes 14RA and 16LA. The angle of attack indications from the upper or "A" probes do not change substantially in output as angle of sideslip changes. The upper line represents the sensed angle of attack at the top probes ($\alpha_A$) as angle of sideslip increases. The output from the "A" probes ($\alpha_A$) remains Substantially the same when plane 43A is substantially parallel to plane 12. The angle of attack output at probe 16LC ($\alpha_{LC}$) iS represented in FIG. 10 at three different values of air vehicle flight reference line (FRL) angle of sideslip ($\beta_{FRL}$). At α=0, the angle of attack indicated at 16LC ($\alpha_{LC}$) iS constant. At $+\beta_{FRL}$ (sideslip to left shown in FIG. 1) the angle of attack indication ($\alpha_{LC}$) (at any given angle of attack) increases as $+\beta_{FRL}$ increases. At value $\beta_{FRLi}$ the difference in sensitivity of probe 16LC to the angle of attack measured by probe 16LA provides a reliable indication of β. Likewise, at $-\beta_{FRL}$ the angle of attack indication at probe 16LC decreases as the sideslip angle β decreases. Again the change in sensitivity and the difference in the values of $\alpha_{LC}$ provides an indication of $\beta_{FRL}$. This change in value of the $\alpha_{LC}$ output at probe 16LC represented by double arrows along line $\beta_{FRL}$ in FIG. 10 can be used as a direct indication of $\beta_{FRL}$ or for compensating angle of attack readings. Also, the differences in the sensed angle of attack at the A and C probes can be used for compensation and for angle of sideslip indication.

One can correct for $\beta_{FRL}$ without pneumatically cross coupling pressure sensing probes on opposite sides of the air vehicle. It can be seen that two probes (the A and C probes as shown) on the same side of the air vehicle can be used to measure angle of sideslip. The angle of sideslip input can be used as a correction factor for other pressure measurements, as is well known.

The output signals for operation are all provided with known circuits in flight data computer 90. In FIG. 2 the lines 14AX, 14BX and 14CX each carry the individual sensed signals from the probes 14RA, 14RB, and 14RC. The lines 16AY, 16BY and 16CY carry the individual sensed signals from probes 16LA, 16LB and 16LC. Lines 15X and 15Y carry sensed signals from the static pressure ports 15R and 15L. The computer 90 provides the output functions needed, including the redundant outputs ($P_{RA}$—$P_{RB}$) etc. The needed subtraction circuits are well known and used in present flight data computers.

Thus, by using the multiple probe arrangement shown, reliable and redundant information can be obtained in a more simple manner.

Although the present invention has been described with reference to preferred embodiments, workers skilled in the art will recognize that changes may be made in form and detail without departing from the spirit and scope of the invention.

What is claimed is:

1. An air data sensing assembly for installation on an air vehicle comprising a first air data sensing probe mounted at a first location on the air vehicle, and a second air data sensing probe mounted at a second location on the air vehicle, each of said air data sensing probes having first and second pressure sensing ports with axes lying on a plane including a longitudinal axis of the respective and being oriented to face in generally opposite directions on each probe to sense first and second pressures which vary as a function of angle of attack, the axes of the first and second ports of the first probe lying on a first plane at a defined inclination to a vertical longitudinal central plane of the air vehicle, and the axes of the first and second ports of the second probe lying on a second plane that is inclined a selected different inclination relative to the vertical longitudinal central plane of the air vehicle than the first plane, sensors to provide separate pressure signals from each of the ports on each of the probes whereby at least one of the functions consisting of static pressure and angle of attack sensed at each probe in the first and second planes, respectively, is obtained from the separate pressure signals, the second plane being inclined at a non-orthogonal angle relative to the first plane sufficiently to cause a change of indication of angle of attack relative to a change in air vehicle angle of sideslip from the signals provided from the ports on the first probe when relative flow past the air vehicle is at an angle relative to the vertical longitudinal central plane of the air vehicle.

2. An air data sensing assembly according to claim 1 wherein the first and second probes are mounted on the same side of the air vehicle, and are spaced apart in a direction perpendicular to the longitudinal axis of the air vehicle.

3. The air data sensing assembly of claim 1, wherein the first and second probes are at substantially the same longitudinal position on the air vehicle.

4. The air data sensing assembly of claim 1 further comprising a source of measured pitot pressure comprising a probe having a port facing toward the flow of air past the air vehicle.

5. The air data sensing assembly of claim 1, further comprising a third probe having a pair of oppositely facing ports with axes lying on a plane that is substantially symmetrical to the plane of the first probe on the air vehicle and which is positioned on an opposite side of the air vehicle from the first probe, and at substantially the same plane taken perpendicular to the central longitudinal plane as the first air data sensing probe.

6. The air data sensing assembly of claim 5, wherein the second probe is mounted at a level below the symmetrical plane of mounting of the first and third probes when the air vehicle is a flight position.

7. The air data sensing assembly of claim 1, at least one of the probes having a pitot port therein to sense pitot pressure, and a sensor to provide an indication of the pressure at such pitot port.

8. The air data sensing assembly of claim 1 and a pair of separate static pressure sensing ports positioned at third and fourth locations at which sensed static pressure varies as a function of air vehicle sideslip, and a computer to receive signals from the first and second air data sensing probes to provide signals indicating both static pressure and angle of attack of the first and second probes, and to receive measured static pressure signals from the static pressure sensing ports, thereby providing pressure signals combinable for redundant indications of air vehicle angle of sideslip.

9. An air data sensing assembly for installation on an air vehicle having convex curved side portions symmetrical about a central longitudinal reference plane comprising a plurality of sets of air data sensing probes, each of said sets comprising a pair of probes, each of said probes having three pressure sensing ports for providing three pressure sensing signals, the first of said ports providing total pressure ($P_{tm}$) and being forwardly facing relative to the direction of movement of the air vehicle, second and third ports having axes lying on a common plane, and being oriented to face in opposite directions and sensing first and second pressures ($P\alpha_1$ and $P\alpha_2$) which vary as a function of angle of attack of the air vehicle measured in a central longitudinal reference plane, the respective probes of each set being on opposite sides of the air vehicle relative to the central longitudinal plane, and being substantially aligned on a plane perpendicular to the longitudinal axis of the air vehicle with the common plane of the axes of said second and third ports of each probe of each set being oriented at substantially equal and opposite non orthogonal angles relative to the central reference plane and at different angles from the common plane of the axes of second and third ports of the other sets, and a pressure sensor for each port of each probe to provide separate pressure indicating signals from each of the ports on each of the probes whereby angle of attack, static pressure, and angle of sideslip can be obtained from the pressure indicating signals.

10. The air data sensing assembly of claim 9 wherein there are three separate sets of probes, and the sets are vertically spaced, whereby the air vehicle surface orients the common plane of each of the probes at a different angular orientation relative to the central longitudinal plane.

11. The air data sensing assembly of claim 10 and a circuit to sense pressure at each port on each probe, and to selectively combine signals at separate probes on the same side of the air vehicle to provide redundant indication of selected parameters.

12. The air data sensing assembly of claim 9 wherein angle of sideslip is determined by measuring pressures indicating angle of attack sensed by a first probe at a level on the air vehicle substantially insensitive to angle of sideslip and from one of the probes of a second or third set having a plane in which angle of attack is sensed by such probe inclined relative to the central longitudinal reference plane of the air vehicle.

* * * * *

UNITED STATES PATENT AND TRADEMARK OFFICE
CERTIFICATE OF CORRECTION

PATENT NO. : 5,616,861
DATED : April 1, 1997
INVENTOR(S) : Hagen

It is certified that error appears in the above-indentified patent and that said Letters Patent is hereby corrected as shown below:

Column 10, line 19, after "respective", insert ---probe---.

Signed and Sealed this

Eighth Day of July, 1997

Attest:

BRUCE LEHMAN

Attesting Officer

Commissioner of Patents and Trademarks